(12) United States Patent
Herschell et al.

(10) Patent No.: US 11,325,562 B1
(45) Date of Patent: May 10, 2022

(54) WIRE MANAGEMENT MODULE FOR A VEHICLE

(71) Applicant: Geotab Inc., Oakville (CA)

(72) Inventors: Frank Herschell, Etobicoke (CA); Christopher Joseph Mendes, Kitchener (CA); Benjamin John Gordon Gaffney, Waterloo (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 17/505,043

(22) Filed: Oct. 19, 2021

Related U.S. Application Data

(60) Provisional application No. 63/227,375, filed on Jul. 30, 2021.

(51) Int. Cl.
| | |
|---|---|
| *B60R 25/045* | (2013.01) |
| *B60R 16/02* | (2006.01) |
| *B60R 16/03* | (2006.01) |
| *B60R 25/24* | (2013.01) |
| *G07C 9/00* | (2020.01) |
| *G06K 19/04* | (2006.01) |

(52) U.S. Cl.
CPC ........ *B60R 25/045* (2013.01); *B60R 16/0215* (2013.01); *B60R 16/03* (2013.01); *B60R 25/24* (2013.01); *B60R 2325/105* (2013.01); *B60R 2325/205* (2013.01); *G06K 19/048* (2013.01); *G07C 2009/00531* (2013.01); *G07C 2009/00539* (2013.01)

(58) Field of Classification Search
None
See application file for complete search history.

(56) References Cited

U.S. PATENT DOCUMENTS

| | | | | |
|---|---|---|---|---|
| 10,768,616 | B2 * | 9/2020 | Kuwabara | B60R 21/00 |
| 10,855,394 | B1 * | 12/2020 | Lee | B60R 25/24 |
| 10,878,704 | B2 * | 12/2020 | Nahle | G08G 1/207 |
| 10,902,763 | B2 * | 1/2021 | Kondo | H04N 21/4882 |
| 10,907,386 | B2 * | 2/2021 | Walawender | B60R 25/01 |
| 11,042,816 | B2 * | 6/2021 | Zaid | H04W 4/027 |
| 11,055,941 | B1 * | 7/2021 | Eber | G07C 9/28 |
| 11,087,571 | B2 * | 8/2021 | Oesterling | H04L 67/104 |
| 11,100,434 | B2 * | 8/2021 | Lord | G06Q 10/047 |

(Continued)

FOREIGN PATENT DOCUMENTS

| | | | | |
|---|---|---|---|---|
| BR | PI0414835 B1 * | 12/2015 | | B60R 25/04 |
| CA | 2906679 A1 * | 9/2014 | | G06Q 30/0645 |

(Continued)

*Primary Examiner* — Fekadeselassie Girma
(74) *Attorney, Agent, or Firm* — Mark J. Pringle-Rigby

(57) ABSTRACT

A wire-management module is configured to be installable to a vehicle having an operable system configured to be energized in response to operative connection between a first wire and a second wire. A user-authentication module is configured to transmit a wire-management signal including a wire-inhibit signal configured to indicate lack of authorization to use the operable system of the vehicle. The wire-management module is configured to be operatively coupled to the first wire and the second wire. The wire-management module has a signal input port configured to receive the wire-inhibit signal that is transmittable from the user-authentication module. The wire-management module is also configured to inhibit operative connection between the first wire and the second wire.

19 Claims, 4 Drawing Sheets

(56) References Cited

U.S. PATENT DOCUMENTS

| | | | | |
|---|---|---|---|---|
| 11,107,304 B1* | 8/2021 | Mendes | ............... | H04W 4/40 |
| 11,200,755 B2* | 12/2021 | Pinkus | ............... | G07C 5/08 |
| 11,210,612 B2* | 12/2021 | Mendes | ............... | B60R 25/24 |
| 11,220,237 B2* | 1/2022 | Keating | ............... | H04B 1/3877 |
| 2002/0186144 A1 | 12/2002 | Meunier | | |
| 2017/0345240 A1* | 11/2017 | Bergerhoff | ............... | H04B 5/0068 |
| 2019/0359171 A1* | 11/2019 | Hori | ............... | B60R 25/045 |
| 2021/0326771 A1* | 10/2021 | Mendes | ............... | H04L 67/12 |
| 2021/0362674 A1* | 11/2021 | Burger | ............... | B60R 25/045 |

FOREIGN PATENT DOCUMENTS

| | | | | |
|---|---|---|---|---|
| CN | 107078535 B | * | 12/2020 | ............ B60L 1/003 |
| KR | 20050063287 A | * | 6/2005 | |
| WO | WO-2020208322 A1 | * | 10/2020 | ............ B60R 16/03 |

* cited by examiner

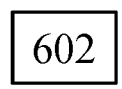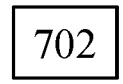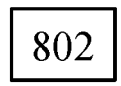
FIG. 4A
FIG. 4B
FIG. 4C

WIRE MANAGEMENT MODULE FOR A VEHICLE

TECHNICAL FIELD

This document relates to the technical field of (and is not limited to): (A) an apparatus for use with a vehicle and a user-authentication module, in which the apparatus includes a wire-management module; and (B) an apparatus including a synergistic combination of a vehicle, a user-authentication module, and a wire-management module; and (C) a method for inhibiting the energization of an operable system of a vehicle by using a synergistic combination of a user-authentication module and a wire-management module.

BACKGROUND

Motor vehicle theft (also called car theft and, grand theft auto) is the criminal act of stealing or attempting to steal a motor vehicle. Nationwide in the United States in 2012, there were approximately 721,000 motor vehicle thefts or approximately 230 motor vehicles stolen for every 100,000 inhabitants. Property losses due to motor vehicle theft in 2012 were estimated at $4.3 billion US dollars.

SUMMARY

It will be appreciated that there exists a need to mitigate (at least in part) at least one problem associated with existing vehicles (also called the existing technology). After much study of, and experimentation with, the existing vehicles, an understanding (at least in part) of the problem and its solution have been identified (at least in part) and are articulated (at least in part) as follows:

What may be required, generally, is a system and/or a method for managing the operation of a vehicle, or managing the operation of a controllable sub-system of the vehicle, depending on whether the user of the vehicle is not authorized, or is authorized, to operate the vehicle.

What may be required, more specifically, is a system and/or a method for managing the operation of a sub-system of a vehicle (depending on whether the user of the vehicle is not authorized, or is authorized, to operate the vehicle).

The method for managing the operation of a controllable system of a vehicle may include (A) inhibiting operation of an operable system (such as a motor, a fuel engine, an electric motor, etc.) of the vehicle (for the case where the user of the vehicle is not authorized to operate the operable system of the vehicle). The method may further include enabling operation of the operable system (such as the engine, the electric motor, etc.) of the vehicle (for the case where the user of the vehicle is authorized to operate the operable system of the vehicle), etc.

What may be required is a system and/or a method for enabling the engine or motor of the vehicle for only an authorized user, where an operator does not need a physical key or fob to gain access to the vehicle.

To mitigate, at least in part, at least one problem associated with the existing technology, there is provided (in accordance with a first major aspect) an apparatus. The apparatus is for use with a vehicle having a first wire, a second wire, and an operable system configured to be energized in response to the operative connection (made or to be made) between the first wire and the second wire. The apparatus is also for use with a user-authentication module configured to be installed to the vehicle. The user-authentication module is also configured to transmit a wire-management signal including a wire-inhibit signal configured to indicate unauthorized energization of the operable system of the vehicle. The apparatus includes and is not limited to a wire-management module having an installation structure configured to be installable to the vehicle. The wire-management module is configured to be operatively coupled to the first wire and the second wire. The wire-management module has a signal input port configured to receive the wire-inhibit signal transmittable from the user-authentication module to the signal input port of the wire-management module. The wire-management module is also configured to inhibit operative connection (made or to be made) between the first wire and the second wire, in response to the signal input port, of the wire-management module, receiving the wire-inhibit signal from the user-authentication module. Energization of the operable system of the vehicle is inhibited when (or after) the wire-management module inhibits operative connection (made or to be made) between the first wire and the second wire, in response to the wire-management module receiving the wire-inhibit signal from the user-authentication module. In this manner, the vehicle cannot be operated by an unauthorized user (thereby preventing theft of the vehicle, leading to reduced costs for operating the vehicle, etc.).

To mitigate, at least in part, at least one problem associated with the existing technology, there is provided (in accordance with a second major aspect) an apparatus. The apparatus includes (and is not limited to) a vehicle having a first wire, a second wire, and an operable system configured to be energized in response to the operative connection (made or to be made) between the first wire and the second wire. The apparatus also includes a user-authentication module configured to be installed to the vehicle. The user-authentication module is also configured to transmit a wire-management signal including a wire-inhibit signal configured to indicate unauthorized energization of the operable system of the vehicle. The apparatus also includes a wire-management module having an installation structure configured to be installable to the vehicle. The wire-management module is configured to be operatively coupled to the first wire and the second wire. The wire-management module has a signal input port configured to receive the wire-inhibit signal transmittable from the user-authentication module to the wire-management module. The wire-management module is also configured to inhibit operative connection (made or to be made) between the first wire and the second wire, in response to the signal input port, of the wire-management module, receiving the wire-inhibit signal from the user-authentication module. Energization of the operable system of the vehicle is inhibited when (or after) the wire-management module inhibits operative connection (made or to be made) between the first wire and the second wire, in response to the wire-management module receiving the wire-inhibit signal from the user-authentication module. In this manner, the vehicle cannot be operated by an unauthorized user (thereby preventing theft of the vehicle, leading to reduced costs for operating the vehicle, etc.).

To mitigate, at least in part, at least one problem associated with the existing technology, there is provided (in accordance with a third major aspect) a method. The method is for inhibiting the energization of an operable system of a vehicle. The method includes (and is not limited to) transmitting, from a user-authentication module configured to be installed to the vehicle, a wire-management signal including a wire-inhibit signal configured to indicate unauthorized energization of the operable system of the vehicle having a first wire, a second wire, and the operable system configured to be energized in response to the operative connection (made or to be made) between the first wire and the second wire. The method also includes receiving the wire-inhibit signal (transmittable from the user-authentication module) by a signal input port of a wire-management module having an installation structure configured to be installable to the vehicle. The wire-management module is configured to be operatively coupled to the first wire and the second wire. The method also includes inhibiting, via the wire-management module, operative connection (made or to be made) between the first wire and the second wire, in response to the signal input port, of the wire-management module, receiving the wire-inhibit signal from the user-authentication module. Energization of the operable system of the vehicle is inhibited when (or after) the wire-management module inhibits operative connection (made or to be made) between the first wire and the second wire, in response to the wire-management module receiving the wire-inhibit signal from the user-authentication module. In this manner, the vehicle cannot be operated by an unauthorized user (thereby preventing theft of the vehicle, leading to reduced costs for operating the vehicle, etc.).

To mitigate, at least in part, at least one problem associated with the existing technology, there is provided (in accordance with a fourth major aspect) a method. The method is for inhibiting the energization of an operable system, of a vehicle, configured to be energized in response to the operative connection (made or to be made) between a first wire and a second wire of the vehicle. The method includes inhibiting operative connection (made or to be made) between the first wire and the second wire, in response to receiving a wire-management signal including a wire-inhibit signal configured to indicate unauthorized energization of the operable system of the vehicle. The wire-inhibit signal is transmittable from a user-authentication module configured to be installed to the vehicle. The energization of the operable system of the vehicle is inhibited when (or after) operative connection (made or to be made) between the first wire and the second wire is inhibited, in response to receiving the wire-inhibit signal from the user-authentication module. In this manner, the vehicle cannot be operated by an unauthorized user (thereby preventing theft of the vehicle, leading to reduced costs for operating the vehicle, etc.).

To mitigate, at least in part, at least one problem associated with the existing technology, there is provided (in accordance with a fifth major aspect) a method. The method is for inhibiting the energization of an operable system, of a vehicle, configured to be energized in response to the operative connection (made or to be made) between a first wire and a second wire of the vehicle. The method includes inhibiting, via a wire-management module, operative connection (made or to be made) between the first wire and the second wire, in response to a signal input port, of the wire-management module, receiving a wire-management signal including a wire-inhibit signal configured to indicate unauthorized energization of the operable system of the vehicle. The wire-inhibit signal is transmittable from a user-authentication module. The wire-management module has an installation structure configured to be installable to the vehicle. The wire-management module is configured to be operatively coupled to the first wire and the second wire. The user-authentication module is configured to be installed to the vehicle. The energization of the operable system of the vehicle is inhibited when (or after) the wire-management module inhibits operative connection (made or to be made) between the first wire and the second wire, in response to the wire-management module receiving the wire-inhibit signal from the user-authentication module. In this manner, the vehicle cannot be operated by an unauthorized user (thereby preventing theft of the vehicle, leading to reduced costs for operating the vehicle, etc.).

To mitigate, at least in part, at least one problem associated with the existing technology, there is provided (in accordance with a sixth major aspect) a method. The method is for inhibiting the energization of an operable system of a vehicle. The method includes transmitting, from a user-authentication module configured to be installed to the vehicle, a wire-management signal including a wire-inhibit signal to a signal input port of a wire-management module, the wire-inhibit signal configured to indicate unauthorized energization of the operable system of the vehicle having a first wire, a second wire. The operable system is configured to be energized in response to the operative connection (made or to be made) between the first wire and the second wire. The wire-management module has an installation structure configured to be installable to the vehicle. The wire-management module is configured to be operatively coupled to the first wire and the second wire. The wire-management module is configured to inhibit operative connection (made or to be made) between the first wire and the second wire, in response to the signal input port, of the wire-management module, receiving the wire-inhibit signal from the user-authentication module. The energization of the operable system of the vehicle is inhibited when (or after) the wire-management module inhibits operative connection (made or to be made) between the first wire and the second wire, in response to the wire-management module receiving the wire-inhibit signal from the user-authentication module. In this manner, the vehicle cannot be operated by an unauthorized user (thereby preventing theft of the vehicle, leading to reduced costs for operating the vehicle, etc.).

Other aspects are identified in the claims. Other aspects and features of the non-limiting embodiments may now become apparent to those skilled in the art upon review of the following detailed description of the non-limiting embodiments with the accompanying drawings. This Summary is provided to introduce concepts in a simplified form that are further described below in the Detailed Description. This Summary is not intended to identify potentially key features or possible essential features of the disclosed subject matter and is not intended to describe each disclosed embodiment or every implementation of the disclosed subject matter. Many other novel advantages, features, and relationships will become apparent as this description proceeds. The figures and the description that follow more particularly exemplify illustrative embodiments.

BRIEF DESCRIPTION OF THE DRAWINGS

The non-limiting embodiments may be more fully appreciated by reference to the following detailed description of the non-limiting embodiments when taken in conjunction with the accompanying drawings, in which:

FIG. 4A, FIG. 4B and FIG. 4C depict schematic views of an embodiment of a method (depicted in FIG. 4A) usable with a user-authentication module associated with the wire-management module of FIG. 1 and FIG. 2, and embodiments of methods (depicted in FIG. 4B and FIG. 4C) usable with the wire-management module of FIG. 1 and FIG. 2

Figure 1:
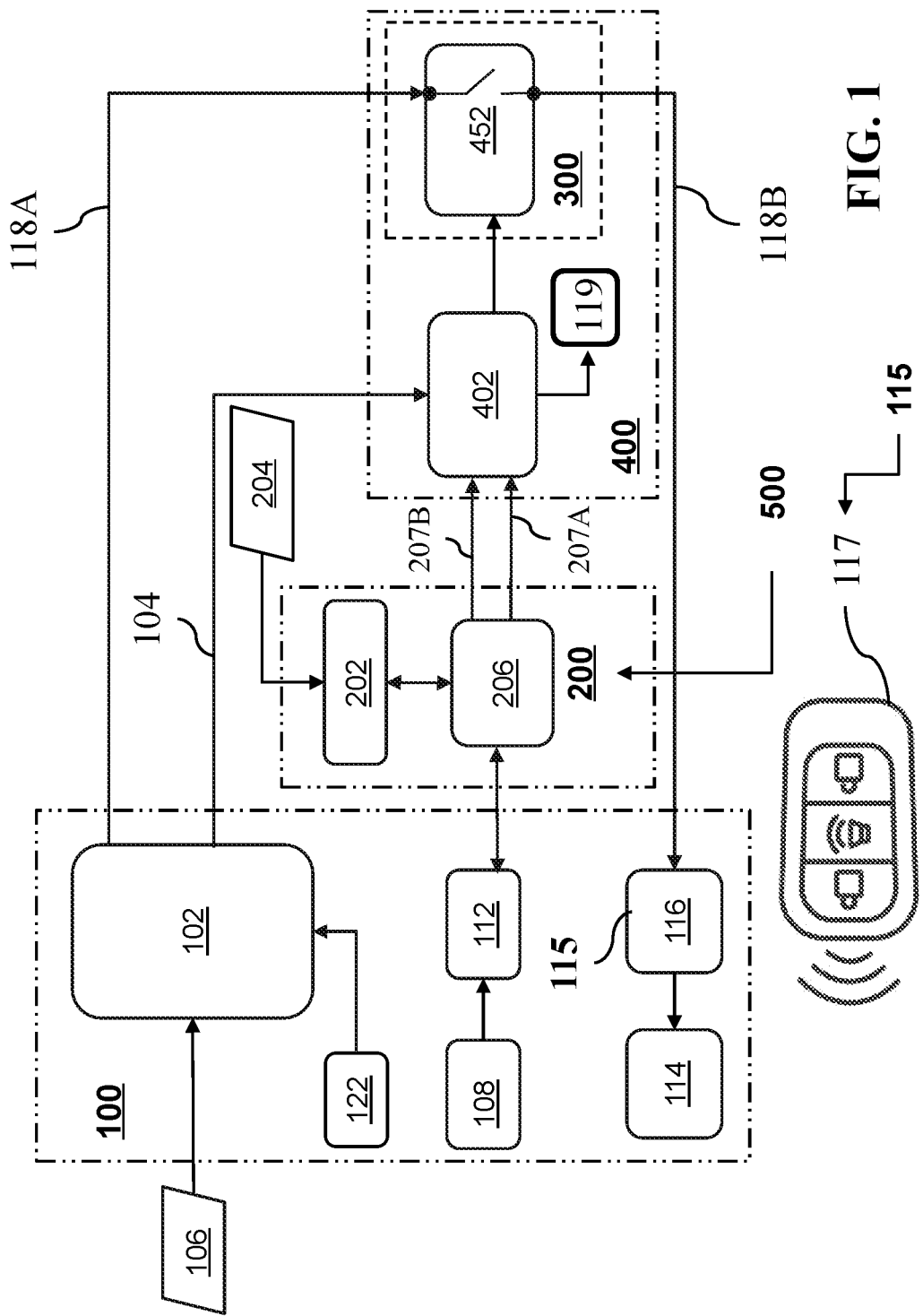
FIG. 1 depicts a schematic block diagram of a wire-management module and a vehicle.

The drawings are not necessarily to scale and may be illustrated by phantom lines, diagrammatic representations, and fragmentary views. In certain instances, details unnecessary for an understanding of the embodiments (and/or details that render other details difficult to perceive) may have been omitted. Corresponding reference characters indicate corresponding components throughout the several figures of the drawings. Elements in the several figures are illustrated for simplicity and clarity and have not been drawn to scale. The dimensions of some of the elements in the figures may be emphasized relative to other elements for facilitating an understanding of the various disclosed embodiments. In addition, common, and well-understood, elements that are useful in commercially feasible embodiments are often not depicted to provide a less obstructed view of the embodiments of the present disclosure.

LISTING OF REFERENCE NUMERALS USED IN THE DRAWINGS vehicle 100
starter switch 102
first switch 102A
second switch 102B
ignition line 104
operator input 106
vehicle interface 108
controller area network 112
vehicle engine 114
operable system 115
starter package 116
keyless entry remote transmitter 117
first wire 118A
second wire 118B
wireless transmitter 119
starter motor 120
vehicle battery 122
controllable starter switch module 152
starter relay switch 154
starter relay coil 156
vehicle telematics device 200
wireless communications module 202
authentication command signal 204
controller unit 206
wire-inhibit signal 207A
wire-enable signal 207B
wiring harness 300
wire-management module 400
driver circuit module 402
voltage regulator 412
current sensing device 414
current sensing output 415
controllable switch module 452
switch 454
coil 456
safety circuit 490
user-authentication module 500
method 600
operation 602
method 700
operation 702
method 800
operation 802

DETAILED DESCRIPTION OF THE NON-LIMITING EMBODIMENT(S)

The following detailed description is merely exemplary and is not intended to limit the described embodiments or the application and uses of the described embodiments. As used, the word "exemplary" or "illustrative" means "serving as an example, instance, or illustration." Any implementation described as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure. The scope of the disclosure is defined by the claims. For the description, the terms "upper," "lower," "left," "rear," "right," "front," "vertical," "horizontal," and derivatives thereof shall relate to the examples as oriented in the drawings. There is no intention to be bound by any expressed or implied theory in the preceding Technical Field, Background, Summary, or the following detailed description. It is also to be understood that the devices and processes illustrated in the attached drawings, and described in the following specification, are exemplary embodiments (examples), aspects, and/or concepts defined in the appended claims. Hence, dimensions and other physical characteristics relating to the embodiments disclosed are not to be considered as limiting, unless the claims expressly state otherwise. It is understood that the phrase "at least one" is equivalent to "a". The aspects (examples, alterations, modifications, options, variations, embodiments, and any equivalent thereof) are described regarding the drawings. It should be understood that the disclosure is limited to the subject matter provided by the claims and that the disclosure is not limited to the particular aspects depicted and described. It will be appreciated that the scope of the meaning of a device configured to be coupled to an item (that is, to be connected to, to interact with the item, etc.) is to be interpreted as the device being configured to be coupled to the item, either directly or indirectly. Therefore, "configured to" may include the meaning "either directly or indirectly" unless specifically stated otherwise.

FIG. 1 depicts a schematic block diagram of a wire-management module 400 and a vehicle 100.

Figure 2:
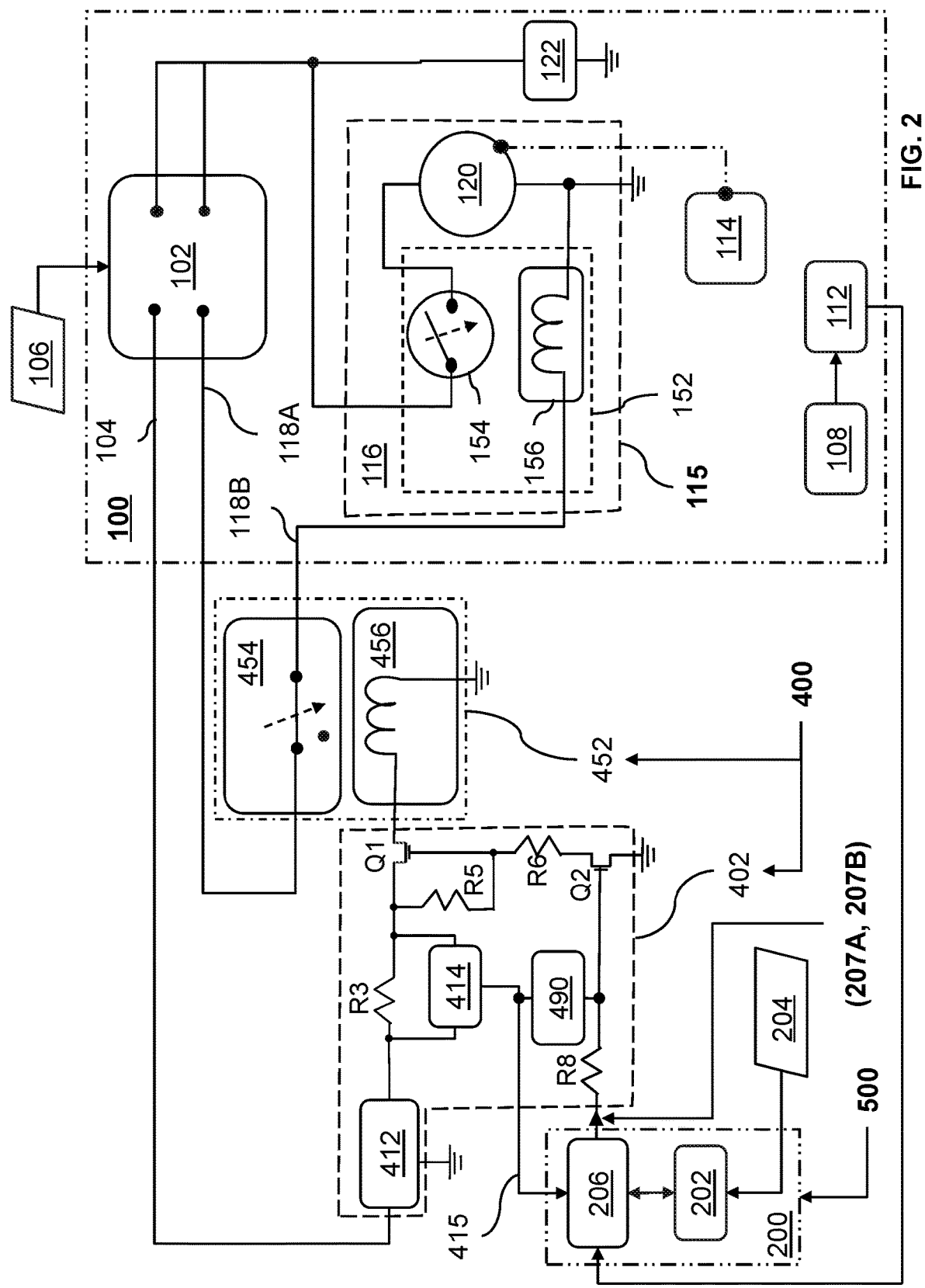
FIG. 2 depicts a schematic block diagram of the wire-management module of FIG. 1 and FIG. 2.

Referring to the embodiment as depicted in FIG. 1, there is depicted an apparatus for use with a vehicle 100 having an operable system 115. The operable system 115 may include an operative system (operable system, sub-system, etc.) of the vehicle 100, such as a starter package 116 configured to be used with a starter motor 120 (as depicted in FIG. 2). The operable system 115 is configured to be energized in response to the application of energy (electrical energy) to the operable system 115 by the second wire 118B operatively connected to the operable system 115 (or the starter package 116). First wire 118A is operatively connected to the vehicle battery 122 of the vehicle 100 via the starter switch 102. The operable system 115 is thereby configured to be energized in response to the operative connection (electrical connection, signal connection) made, or to be made, between the first wire 118A and the second wire 118B (on the basis that there was a determination made that the user was authenticated for operating the operable system 115) and when first wire 118A receives power from vehicle battery 122. This is done in such a way that the energy may be passed from the vehicle battery 122 to the operable system 115 (via the operative connection made between the first wire 118A and the second wire 118B), thereby activating the operable system 115 (since it was determined that the user was authenticated).

The apparatus is also for use with a user-authentication module 500 configured to be installable to (positioned in) the vehicle 100. The user-authentication module 500 is configured to transmit (output) a wire-management signal, such as the wire-inhibit signal 207A, the wire-enable signal 207B, etc. In FIG. 1 wire-inhibit signal 207A and wire-enable signal 207B are separately illustrated, and could be communicated from the user-authentication module 500 on two different signal lines. However, in some implementations the wire-inhibit signal 207A and the wire-enable signal 207B can be two different signals communicated from the user-authentication module over a single line (as is discussed for example with reference to FIG. 2). The wire-inhibit signal 207A (to be provided or transmitted by the user-authentication module 500 to the wire-management module 400) is configured to indicate that there is a lack of authorization for the user to the wire-management module 400. The wire-management module 400 is configured to respond to the wire-inhibit signal 207A by preventing activation (energization) of the operable system 115 (such as the starter package 116) of the vehicle 100 for the case where the user attempts (re-attempts) to activate the operable system 115. The prevention of activation is done by not operatively connecting the first wire 118A and the second wire 118B together (thereby preventing energization or activation of the operable system 115). The wire-inhibit signal 207A is configured to urge the wire-management module 400 to prevent unauthorized energization of operable system 115, by the user, for the case where the determination was made (by the user-authentication module 500) that the user is unauthorized to operate the operable system 115 of the vehicle 100. The apparatus includes (and is not limited to) a wire-management module 400. The wire-management module 400 may be called a wire inhibit-or-enable module, a wire inhibit-module, etc. The wire-management module 400 has (includes) an installation structure (known and not depicted) configured to be installable to the vehicle 100. The wire-management module 400 is configured to be operatively coupled to the first wire 118A. More preferably, the wire-management module 400 has a first terminal configured to be operatively electrically connectable to the first wire 118A. The wire-management module 400 is also configured to be operatively coupled to the second wire 118B. More preferably, the wire-management module 400 has a second terminal configured to be operatively electrically connectable to the second wire 118B. The wire-management module 400 has a signal input port configured to receive (input) the wire-inhibit signal 207A. The wire-inhibit signal 207A is configured to be transmittable from the user-authentication module 500 (to the wire-management module 400), either directly, indirectly, wirelessly, via wire, etc. The wire-management module 400 is also configured to inhibit operative connection (made or to be made) between the first wire 118A and the second wire 118B, in response to the signal input port, of the wire-management module 400, receiving the wire-inhibit signal 207A from the user-authentication module 500. More preferably, the wire-management module 400 is also configured to disconnect (electrically disconnect) the first wire 118A and the second wire 118B from each other; this is done in response to the signal input port, of the wire-management module 400, receiving the wire-inhibit signal 207A from the user-authentication module 500. A technical advantage provided by the wire-management module 400 is inhibited activation or energization (de-energization) of the operable system 115 (such as the starter package 116) of the vehicle 100 when (or after) the wire-management module 400 inhibits operative connection (made or to be made) between the first wire 118A and the second wire 118B (in response to the wire-management module 400 receiving the wire-inhibit signal 207A from the user-authentication module 500). In this manner, the vehicle 100 cannot be operated by an unauthorized user (thereby preventing theft of the vehicle 100, leading to reduced costs for operating the vehicle 100, etc.).

In one example, referring to the embodiment as depicted in FIG. 1, the operable system 115 (of any type of vehicle, such as an internal combustion powered vehicle, or an electric vehicle, etc.) may include a fob, etc. The fob (also called a keyfob, remote, etc.) is a keyless entry remote transmitter 117, which is any wireless electronic device configured to unlock a door of the vehicle 100, start the vehicle 100, and/or remotely initiate the action (activation) of another device not connected to the vehicle 100 (such as a garage door of a building, a door of a house, etc.). For this case, the wire-management module 400 optionally includes a wireless transmitter 119 configured to wirelessly communicate signals to the keyless entry remote transmitter 117, and the first wire 118A and the second wire 118B are operatively connected (electrically connected) to the wireless transmitter 119, thereby permitting control of the remote transmitter 117 by the wire-management module 400. The operable system 115 includes (preferably) the keyless entry remote transmitter 117 configured to operate at least one operable system (sub-system) of the vehicle 100, and the wire-management module 400 is configured to be in signal communication (wireless communication, etc.) with the keyless entry remote transmitter 117. An advantage for this arrangement is there is no requirement to cut any line (signal wire, power line, etc.) and subsequent splice (hardwiring) of the wire-management module 400 (via the wiring harness 300) to the spliced line (thereby reducing labor costs and/or installation costs for the wire-management module 400 to the vehicle 100).

Referring to the embodiment as depicted in FIG. 1, the wire-management module 400 is configured to manage operation (disable operation, enable operation) of the operable system 115 of the vehicle 100. For the case where the vehicle 100 includes an all-electric vehicle that may not have a starter line extending from the starter switch 102 to a starter package 116 (as depicted in FIG. 1 or FIG. 2), other suitable types of the operable system 115 may be selected or utilized for use with the wire-management module 400. Due to the lack of standardization in all-electric vehicles, where to incorporate wire-management module 400 in the vehicle 100 may need to be determined on a vehicle-by-vehicle basis. An exemplary embodiment that may be applicable for the all-electric vehicle is to cut the signal line (signal wire) extending between the brake module (known and not depicted) and the body control module (BCM, known and not depicted) of the vehicle 100, and then splice (hardwire) the wire-management module 400 (via the wiring harness 300) to the spliced signal line, on the basis that the all-electric vehicles may require the user (operator) to press (engage) the brake assembly in order to enable the starting of the all-electric vehicle. However, this arrangement may have safety implications and might not be a preferred option, and so a generally safer vehicle-specific option may be identified, if required.

Referring to the embodiment as depicted in FIG. 1, the user-authentication module 500 is also configured to transmit a wire-enable signal 207B. The wire-enable signal 207B (to be provided or transmitted by the user-authentication module 500 to the wire-management module 400) is configured to indicate that there is authorization for the user to the wire-management module 400. The wire-management module 400 is configured to respond to the wire-enable signal 207B by enabling activation (energization) of the operable system 115 (such as the starter package 116) of the vehicle 100 for the case where the user attempts (re-attempts) to activate the operable system 115. The activation is enabled by operatively connecting the first wire 118A and the second wire 118B together (thereby enabling energization or activation of the operable system 115). The wire-enable signal 207B is configured to urge the wire-management module 400 to enable authorized energization of operable system 115, by the user, for the case where the determination was made (by the user-authentication module 500) that the user is authorized to operate the operable system 115 of the vehicle 100. The wire-management module 400 is also configured to electrically connect the first wire 118A and the second wire 118B together (this is done in response to the signal input port of the wire-management module 400 receiving the wire-enable signal 207B from the user-authentication module 500). Another technical advantage provided by the wire-management module 400 is enabled energization of the operable system 115 (such as the starter package 116) of the vehicle 100 when (or after) the wire-management module 400 enables operative connection (made or to be made) between the first wire 118A and the second wire 118B in response to the wire-management module 400 receiving the wire-enable signal 207B from the user-authentication module 500. In this manner, the vehicle 100 may be operated by an authorized user (thereby preventing theft of the vehicle 100, leading to reduced costs for operating the vehicle 100, etc.).

Referring to the embodiment as depicted in FIG. 4A, there is provided a method 600 (to be used by the user-authentication module 500) for inhibiting the energization of the operable system 115 (such as the starter package 116 for use with the starter motor 120, as depicted in FIG. 2) of the vehicle 100. The method 600 includes an inhibiting operation 602 including transmitting, from the user-authentication module 500 configured to be installed to a vehicle 100, the wire-inhibit signal 207A. The wire-inhibit signal 207A is configured to indicate lack of authorization (user authentication) to use the operable system 115 of the vehicle 100 having the first wire 118A and the second wire 118B. The operable system 115 is configured to be energized in response to the operative connection (made or to be made) between the first wire 118A and the second wire 118B. Referring to the embodiment as depicted in FIG. 4B, there is provided a method 700 (to be used by the wire-management module 400). The method 700 includes an inhibiting operation 702 including receiving the wire-inhibit signal 207A (transmittable from the user-authentication module 500) by the signal input port of the wire-management module 400. The wire-management module 400 has an installation structure configured to be installable to the vehicle 100. The wire-management module 400 is configured to be operatively coupled to the first wire 118A and the second wire 118B. Referring to the embodiment as depicted in FIG. 4C, there is provided a method 800 (to be used by the wire-management module 400). The method 800 includes an inhibiting operation 802 including inhibiting, via the wire-management module 400, operative connection (made or to be made) between the first wire 118A and the second wire 118B, in response to the signal input port, of the wire-management module 400, receiving the wire-inhibit signal 207A from the user-authentication module 500. Energization of the operable system 115 of the vehicle 100 is inhibited when (or after) the wire-management module 400 inhibits operative connection (made or to be made) between the first wire 118A and the second wire 118B, in response to the wire-management module 400 receiving the wire-inhibit signal 207A from the user-authentication module 500. In this manner, the vehicle 100 cannot be operated by an unauthorized user (thereby, the wire-management module 400 prevents theft of the vehicle 100, leading to reduced costs for operating the vehicle 100, etc.).

Referring to the embodiment as depicted in FIG. 1, an operator (the user) may book the vehicle 100 using an application (vehicle share app, etc.) installed in a mobile device (such as a cellular phone, smartphone, etc.). The user may unlock the vehicle 100 via the mobile device. It will be appreciated that other use cases may include a fleet where drivers (vehicle users) are not necessarily assigned the same vehicle from day-to-day. Mobile devices are also not the only option for access to the vehicle, and other known authentication technology may be used, such as RFID cards (Radio-Frequency Identification cards), etc., and any equivalent thereof. Keyless systems enable vehicle access without the user (operator) possessing a physical key (bladed key) or a keyfob prior to accessing the vehicle. The user may use a physical key (bladed key) for starting the vehicle, but may not be in possession of this physical key prior to vehicle access. In accordance with an embodiment, the physical key (bladed key) may be stored in the vehicle. For the case where the vehicle includes a bladed key ignition switch (where the physical key must be inserted to initiate cranking of the engine), the user may gain keyless access to the interior of the vehicle, and subsequently, the user may retrieve the physical key from a storage compartment (secure or unsecured, etc.). For instance, the physical key may be placed or found in the glove compartment, or in a secure box that is unlocked in response to the operator accessing the vehicle 100. In the case of push-to-start ignition switches (where the operator pushes a button to start the engine of the vehicle 100, with the key fob placed in proximity to the ignition switch), the key fob may (A) be stored in the vehicle, and connected to a power source that is only powered up in response to the operator gaining vehicle access, and/or (B) be stored in a secure box which includes manual actuators for pressing buttons on the key fob. It will be appreciated that these options are not exclusive; for instance, the keyfob may only be powered in response to the user gaining authorized vehicle access, and subsequently the mechanical actuators may push the unlock and lock buttons on the keyfob to unlock or lock the vehicle doors, etc. (if desired).

Referring to the embodiment as depicted in FIG. 1, for the case where the physical key is stored in the vehicle 100, a thief might break into the vehicle 100, then find and use the physical key to thereby steal the vehicle 100. This unwanted scenario may be prevented by the wire-management module 400 (also called an inhibit system, starter inhibit system), where the vehicle 100 cannot be started without authenticated access (including a determination whether the user is authenticated to operate the vehicle 100 or the operable system 115, etc.).

Referring to the embodiment as depicted in FIG. 1, the first wire 118A and the second wire 118B are configured to transmit any type of electromagnetic phenomena, such as electrical current, electrical voltage, whether DC (Direct Current) or AC (Alternating Current), light, and any equivalent thereof. The first wire 118A and the second wire 118B may include any type of elongated electromagnetic transmission medium, electrical-conduction wires, insulated copper wires, fiber-optic cables configured to transmit light, etc., and any equivalent thereof. The second wire 118B may be configured to provide a return path (for the current, etc.) for the first wire 118A, etc.

Referring to the embodiment as depicted in FIG. 1, for the case where the wire-management module 400 is to be installed to the vehicle 100 as an aftermarket retrofit, a single wire (of the vehicle 100) may be cut to form the first wire 118A and the second wire 118B, and then the wire-management module 400 is connected to the first wire 118A and the second wire 118B, etc.

Referring to the embodiment as depicted in FIG. 1, there is depicted the case where the wire-management module 400 is equipment to be installed by an OEM (Original Equipment Manufacturer) to the vehicle 100. For this case, the apparatus includes (and is not limited to) a synergistic combination of the vehicle 100, the user-authentication module 500, and the wire-management module 400.

Referring to the embodiment as depicted in FIG. 1, the first wire 118A includes a hot wire, and the second wire 118B includes a neutral wire (a return path). A hot wire is a wire to be connected to an energy source, such as a vehicle battery, etc. A neutral wire is a wire to be connected to a device (such as the starter package 116, etc.) configured to use (consume) the energy provided by the energy source (such as the vehicle battery) via the first wire 118A.

Referring to the embodiment as depicted in FIG. 1, the first wire 118A includes a hot starter wire electrically connected to, and extending from, the starter switch 102. The second wire 118B includes a neutral starter wire electrically connected to, and extending from, the starter package 116.

Referring to the embodiment as depicted in FIG. 1, the vehicle 100 may include a combustion-engine vehicle, an all-electric vehicle, a hybrid vehicle, a hydrogen-fueled vehicle, a natural-gas powered vehicle, an automobile, a commercial truck, etc., and any equivalent thereof. For instance, the second wire 118B may be configured to be electrically coupled to an electrical motor configured to move an all-electric vehicle, etc.

Referring to the embodiment as depicted in FIG. 1, the vehicle 100 includes a starter switch 102, a vehicle engine 114, a starter package 116, and a starter line. The starter line includes the first wire 118A and the second wire 118B.

Referring to the embodiment as depicted in FIG. 1, when the wire-management module 400 is actuated (activated) to disconnect the first wire 118A and the second wire 118B from each other in response to the wire-management module 400 receiving the wire-inhibit signal 207A (or not receiving the wire-enable signal 207B), the first wire 118A and the second wire 118B are not operatively (electrically) connected together and remain electrically (operatively) isolated from each other (in response to the wire-management module 400 receiving an inhibit signal, such as the wire-inhibit signal 207A). In this manner, the vehicle 100 may not be operated by an unauthorized user (thereby, the wire-management module 400 prevents theft of the vehicle 100, leading to reduced costs for operating the vehicle 100, etc.).

Referring to the embodiment as depicted in FIG. 1, when the wire-management module 400 is actuated (activated) to connect the first wire 118A and the second wire 118B together in response to the wire-management module 400 receiving the wire-enable 207B (or not receiving the wire-inhibit signal 207A), the first wire 118A and the second wire 118B are connected together (in response to the wire-management module 400 receiving an enable signal, such as the wire-enable signal 207B), thereby permitting actuation of the starter package 116, thereby enabling cranking of the engine of the vehicle 100 via a starter motor 120 (as depicted in FIG. 2). The starter package 116 is configured to electrically connect the starter motor 120 to a vehicle battery 122 (as depicted in FIG. 2), in response to the wire-enable signal 207B (also called an activation output signal) provided by the user-authentication module 500 to the wire-management module 400, the wire-management module 400 responds to electrically connect the first wire 118A and the second wire 118B together (in response to the wire-management module 400 receiving the wire-enable signal 207B). In turn, the starter motor 120 is configured to crank the vehicle engine 114 in response to activation of the starter package 116. In this manner, the vehicle 100 may be operated by an authorized user.

Referring to the embodiment as depicted in FIG. 1, the starter switch 102 may include a keyhole type rotatable switch (in which a key is inserted into the keyhole) to operate the starter switch 102 and any equivalent thereof. Alternatively, the starter switch 102 may have (include) a push-to-start switch (button) in combination with a fob device or smart-key device to authorize driving of the vehicle and any equivalent thereof. The push-to-start switch is configured to recognize the smart-key device by way of unique radio signals emitted from the smart-key device. The starter switch 102 is configured to be manipulated by the user. The operator input 106 represents the input action of the user for manipulating the starter switch 102 from switch state to switch state. The starter switch 102 is configured to (A) enable activation of the electrical system of the vehicle 100 (in response to user manipulation of the starter switch 102), and (B) disable activation of the electrical system of the vehicle 100 (in response to user manipulation of the starter switch 102).

Referring to the embodiment as depicted in FIG. 1, the wire-management module 400 is configured to be installed (e.g. retrofitted) to the starter switch 102; that is, the wire-management module 400 is configured to be electrically connected (operatively coupled), via the ignition line 104, to the starter switch 102, thereby providing power to the wire-management module 400. The wire-management module 400 is configured to receive an application of voltage (power), via the ignition line 104, from the starter switch 102 when (or after) the user manipulates the starter switch 102, thereby providing power to the wire-management module 400.

Referring to the embodiment as depicted in FIG. 1, the wire-management module 400 is configured to receive an authentication signal (wire-management signal, a management signal, such as the wire-inhibit signal 207A, the wire-enable signal 207B, etc.) configured to indicate that the user of the vehicle is an authentic user. The wire-management module 400 is configured to be installed (retrofitted) to the first wire 118A and the second wire 118B; that is, the wire-management module 400 is also configured to electrically connect to the starter switch 102 via the first wire 118A, and to the starter package 116 via the second wire 118B. It will be appreciated that the starter line (for connecting the starter package 116 with the starter switch 102) may include the first wire 118A and the second wire 118B. The wire-management module 400 is configured to transmit (output) an application of voltage (power) from the starter switch 102 to the starter package 116 (by electrically connecting the first wire 118A and the second wire 118B together), when (or after) the wire-management module 400 has received the wire-enable signal 207B confirming that the user is an authentic user of the vehicle 100. The wire-management module 400 may be spliced into an existing starter line (directly connecting the starter switch 102 to the starter package 116); this is done such that any voltage (power) from the starter switch 102 to the starter package 116 is provided (enabled) for the case where the wire-management module 400 permits the starter package 116 to receive the voltage from the starter switch 102 (since the first wire 118A and the second wire 118B are electrically connected by the wire-management module 400 for this case). The wire-management module 400 is configured to be in signal communication (electrical communication, wired or wireless) with the starter switch 102 and the starter package 116, and the starter switch 102 is not directly electrically connected to the starter package 116. The wire-management module 400 is configured to manage the selective operation (inhibit and/or enable activation) of the starter package 116 by applying power from the starter switch 102 to the starter package 116 (depending on the input control signal received by the wire-management module 400). The wire-management module 400 is configured to apply voltage (power) from the starter switch 102 to the starter package 116, so that the starter package 116 may start the vehicle engine 114 only when the user is authenticated to use the vehicle 100. The starter package 116 is configured to start (crank) the vehicle engine 114 of the vehicle 100 having the starter switch 102 configured to be operated by the user only when the wire-management module 400 receives the user-authentication signal indicating that the user is authenticated to use the vehicle 100.

Referring to the embodiment as depicted in FIG. 1, the wire-management module 400 is also configured to be in signal communication (electrical communication) with a user-authentication module 500. The user-authentication module 500 is configured to transmit (output) a wire-management signal, such as the wire-inhibit signal 207A, the wire-enable signal 207B (as depicted in FIG. 1), etc. configured to indicate that the user, operating the starter switch 102 of the vehicle 100, is an authenticated user.

Referring to the embodiment as depicted in FIG. 1, in accordance with a preferred embodiment, a computer device (known and not depicted) includes the user-authentication module 500. The computer device has a processor (known and not depicted) operatively connected to a memory unit (known and not depicted) configured to tangibly receive and store computer-executable instructions configured to execute operations (functions) of the user-authentication module 500, and other operations not associated with the user-authentication module 500. The functions (operations) of the user-authentication module 500 are described for example in U.S. Provisional Patent Application No. 63/012,536, which is incorporated herein in its entirety. The computer device is configured (preferably) to be electrically connectable to the wire-management module 400 (preferably via a USB connector, USB wire, etc.).

Referring to the embodiment as depicted in FIG. 1, in accordance with a preferred embodiment, a vehicle telematics device 200 (also called a tracker device, etc.) includes the user-authentication module 500. The vehicle telematics device 200 is configured to electrically communicate (operatively interface) with a controller area network 112 of the vehicle 100. An embodiment of the vehicle telematics device 200 may include the GEOTAB (TRADEMARK) GO (TRADEMARK) vehicle telemetric device, manufactured by GEOTAB, headquartered in Canada. The wire-management module 400 is configured (preferably) to be electrically connectable to the vehicle telematics device 200 via a USB connector, USB wire, etc. The vehicle telematics device 200 includes (preferably) a wireless communications module 202, such as a BLUETOOTH (TRADEMARK) wireless transmitter device, cellular communications device, etc. The wireless communications module 202 is configured to receive an authentication command signal 204 from a user device, etc. (known and not depicted, such as an RFID device, cell phone, etc.). The vehicle telematics device 200 includes a controller unit 206 (such as a microcontroller unit, etc.).

In another implementation, a single integrated device could include the wire-management module 400 and the user-authentication module 500. For example, wire-management module 400 could include at least one processor and wireless communication hardware, for communicating with an operator device to perform authentication of the operator.

Referring to the embodiment as depicted in FIG. 1, in accordance with a preferred embodiment, the wire-management module 400 includes a driver circuit module 402 and a controllable switch module 452 (such as a relay and coil module). The driver circuit module 402 is configured to receive wire-management signals from the user-authentication module 500. The controllable switch module 452 is configured to be driven by control signals provided by the driver circuit module 402 to the controllable switch module 452. In accordance with a preferred embodiment, the controllable switch module 452 is included in a wiring harness 300 configured to electrically connect (interface) the wire-management module 400 to the starter switch 102 and the starter package 116.

Referring to the embodiment as depicted in FIG. 1, a wiring harness 300 is configured to electrically connect (A) the ignition line 104 that extends from the starter switch 102 configured to be electrically connected, via the wiring harness 300, to the wire-management module 400; and (B) the first wire 118A and the second wire 118B that extend from the starter switch 102, and are configured to be electrically connected, via the wiring harness 300, to the wire-management module 400; and (C) the second wire 118B that extends from the wire-management module 400, via the wiring harness 300, to the starter package 116 of the vehicle 100.

Referring to the embodiment as depicted in FIG. 1, the wiring harness 300 may be installed in accordance with the following method. The ignition line is spliced, and the wiring harness 300 is inserted into the splice. The wiring harness 300 may include multiple pathways with multiple relays or at least one relay configured to selectively manage (enable, activate, inhibit, etc.) the controllable elements or components of the vehicle 100, based on authorized access by a user (as indicated by the user-authentication module 500 to the wire-management module 400). For instance, if the user gaining access is a cleaner, the vehicle can be unlocked, and dashboard displays may be enabled, but the vehicle ignition may be disabled. For instance, a vehicle mechanic may be given full access. If no valid authentication is received by the wire-management module 400, the wire-management module 400 is configured to initiate activation of the horn of the vehicle, etc.

Referring to the embodiment as depicted in FIG. 1, the vehicle 100 includes a vehicle interface 108. The vehicle interface 108 may include an onboard diagnostics port port (an OBD-II Port, etc.) and/or a controller area network 112, and/or any equivalents thereof. On-board diagnostics (OBD)

refers to a vehicle's self-diagnostic and reporting capability. The vehicle gives access to the status of the various vehicle sub-systems such as engine temperature and engine speed. The OBD-II standard specifies the type of diagnostic connector and its pinout, the electrical signaling protocols available, and the messaging format.

Referring to the embodiment as depicted in FIG. 1, the vehicle 100 includes a controller area network 112 (also called a CAN bus, hereafter referred to the network 112). The CAN bus is a vehicle bus standard designed to allow electronic control units (ECUs, such as brake, engine, electronic fuel injection, automatic gearbox, anti-lock braking system, etc.) to communicate with each other within a vehicle without a central computer. The controller area network 112 is the nervous system of the vehicle, enabling communication. In turn, the nodes or ECUs are interconnected via the CAN bus. Information sensed by one part can be shared with another. In an automotive CAN bus system, ECUs may include the engine control unit, airbags, audio system, etc. The ECUs may have information that needs to be shared with other parts of the network. When an OBD-II scan tool is attached to the network 112, it sends specially formatted diagnostic command messages over the network 112. The nodes on the network 112 can output (transmit) diagnostic information, receive (listen for) messages, and transmit the requested status information over network 112 when asked (interrogated).

FIG. 2 depicts a schematic block diagram of the wire-management module 400 of FIG. 1.

Referring to the embodiment as depicted in FIG. 2, the second wire 118B is configured to provide a return path for the current to be provided by the first wire 118A for initiating movement of the vehicle 100.

Referring to the embodiment as depicted in FIG. 2, the first wire 118A is configured to be connected to an electrical energy source of the vehicle 100.

Referring to the embodiment as depicted in FIG. 2, the first wire 118A is configured to be connected (e.g. indirectly via a fuse assembly) to the vehicle battery 122.

Referring to the embodiment as depicted in FIG. 2, the first wire 118A is configured to be connected (e.g. indirectly via a fuse assembly) to a starter switch 102 configured to be connected to the vehicle battery 122 of the vehicle 100.

Referring to the embodiment as depicted in FIG. 2, the operable system 115 includes a starter package 116 configured to urge rotation of a starter motor 120 configured to crank the vehicle engine 114 of a vehicle 100. The second wire 118B is configured to be electrically coupled to the starter package 116. The illustrated starter package 116 includes a controllable starter switch module 152 (also called a starter solenoid) and a starter motor 120. Controllable starter switch module includes a starter relay switch 154 (also called a starter solenoid switch) and a starter relay coil 156 (also called a starter solenoid coil). When starter relay coil 156 has current flowing therethrough from second wire 118B, starter relay switch 154 is urged closed, such that power is provided from vehicle battery 122 to starter motor 120. This causes starter motor 120 to crank (and start) engine 114. However, as mentioned above, the starter package 116 could be replaced with any operable component 115 of vehicle 100, to selectively inhibit operation thereof.

Referring to the embodiment as depicted in FIG. 2, there are five operation modes of the wire-management module 400: the first operating mode, the second operating mode, the third operating mode, the fourth operating mode, and the fifth operating mode. The following description of the interactions between the user and the starter switch 102 (in association with the preferred descriptions of the operating modes) are applicable for the case where the starter switch 102 includes a bladed key ignition switch, and any equivalent thereof. In accordance with an alternative embodiment, the starter switch 102 may include any type of ignition switch, such as a push-to-start switch, etc. It will be appreciated that while the description is specific about how the user handles and applies force to the key inserted into the starter switch 102, the manner in which the user applies force to the starter switch 102 is exemplary, and any appropriate type of the starter switch 102 may be implemented, etc.

First Operating Mode

Referring to the embodiment as depicted in FIG. 2, the starter switch 102 is placed in a first state. A controllable switch module 452 (also called a switchable relay device) includes a coil 456 and a switch 454. The starter switch 102 is placed in the first state, in which the electrical system (of the vehicle 100) is OFF (not energized), and the vehicle engine 114 is OFF (not operating). The switch 454 is configured to be (A) normally closed when there is no current flowing through the coil 456 (that is, the coil 456 is deactivated); and (B) open when current flows through the coil 456 (that is, the coil 456 is active or energized). In the first operation mode, (A) the starter switch 102 is not operated to apply any voltage to the ignition line 104; and (B) the voltage regulator 412 is not energized since starter switch 102 does not apply voltage (power) to the voltage regulator 412 via the ignition line 104 (therefore, the voltage regulator 412 is not activated); and (C) no current flows through the controllable switch Q1 (a transistor, in the illustrated example) since the voltage regulator 412 is not active; and (D) no current is made to flow through the coil 456 (since no current flows through the transistor Q1); and (E) the switch 454 is closed since there is no current flowing through the coil 456 (since the coil 456 is deactivated or de-energized for lack of current flow before the starter switch 102 is operated to apply voltage to the ignition line 104). In the first operational mode, the starter switch 102 is not operated to apply any voltage to the first wire 118A (first starter line).

FIG. 2 illustrates controllable switch module 452 as being a coil relay having coil 456 and switch 454; however, use of this type of relay is merely exemplary. Any other appropriate type of relay or switching device could be used as controllable switch module 452 instead, such as a solid state relay.

Second Operating Mode

Referring to the embodiment as depicted in FIG. 2, the starter switch 102 is placed in a second switch state (the electrical system of the vehicle 100 is activated). It will be appreciated that the wire-management module 400 includes (preferably) electrical transient suppression devices (known and not depicted) configured to protect the wire-management module 400 against overvoltages, etc. The user turns (or operates, e.g. by pushing a button) the starter switch 102 so that: (A) voltage (power) is applied to the ignition line 104 so that the electrical system (of the vehicle 100) is turned ON (activated); and (B) no voltage (power) is applied to the first wire 118A or the second wire 118B (thereby, the vehicle engine 114 does not receive cranking action, from the starter motor 120, to turn over, and remains OFF or not cranked). The wire-management module 400 is configured to receive (input) a voltage (power) from the ignition line 104 extending from the starter switch 102 (which is configured to be operated by the user of the vehicle 100). The voltage regulator 412 is configured to receive (input) the applied voltage (power) from the starter switch 102, via the ignition line 104. The applied voltage, to be received by the voltage regulator 412, may include 12 volts DC (direct current), 24 volts DC, or any ignition voltage and/or signal, etc., and any equivalent thereof. The voltage regulator 412 is configured to output a predetermined output voltage (such as 12 volts DC), etc. It will be appreciated that the voltage regulator 412 is an optional component, and may include any type of voltage regulator, power regulator, including a linear voltage regulator, a switching voltage regulator, and any equivalent thereof. The controllable switch Q1 is configured to control (turn OFF and turn ON) the flow of current through the coil 456. The controllable switch Q1 is configured to control whether or when current flows from the voltage regulator 412 to the coil 456. The controllable switch Q1 is configured to selectively stop or start the flow of current through the coil 456 (from the voltage regulator 412). The controllable switch Q1 is configured to control the state (energization) of the coil 456. The controllable switch Q1 may include a P-channel MOSFET device (Metal-Oxide-semiconductor Field-Effect Transistor). After (when, once) the voltage is applied to the ignition line 104 by the starter switch 102, the voltage regulator 412 is activated, and the controllable switch Q1 allows the flow of current through the coil 456 (absent an authorization signal as discussed later with reference to the third operating mode). The switch 454 is opened when current is made to flow through the coil 456. When (after) the switch 454 is opened (in response to the current flowing through the coil 456), the starter package 116 is disabled and, therefore, cannot energize the starter motor 120 even if voltage is applied to first wire 118A, and the starter motor 120 cannot crank the vehicle engine 114, and the vehicle engine 114 remains OFF. Therefore, the starter package 116 cannot crank the vehicle engine 114 when (after) the switch 454 is opened. In the second operating mode, the vehicle engine 114 is locked out from operating while the electrical system of the vehicle 100 may operate (be activated). Before the user attempts to start the vehicle engine 114, the vehicle engine 114 is locked out from operating. When the user attempts to start the vehicle engine 114, the user-authentication module 500 is configured to receive, or detect, an indication indicating whether or not the user is an authentic user. For the case where the user-authentication module 500 cannot provide an indication to the wire-management module 400 that the user is an authentic user, the wire-management module 400 prevents or inhibits the starter package 116 (which in turn inhibits cranking of the engine of the vehicle engine 114) so that the user remains locked out from operating an aspect of the vehicle 100, as discussed in detail in the third operating mode below. For the case where the user-authentication module 500 can provide an indication to the wire-management module 400 that the user is an authentic user, the wire-management module 400 enables the vehicle engine 114 to operate, as discussed in the third operating mode below.

Third Operating Mode

Figure 3:
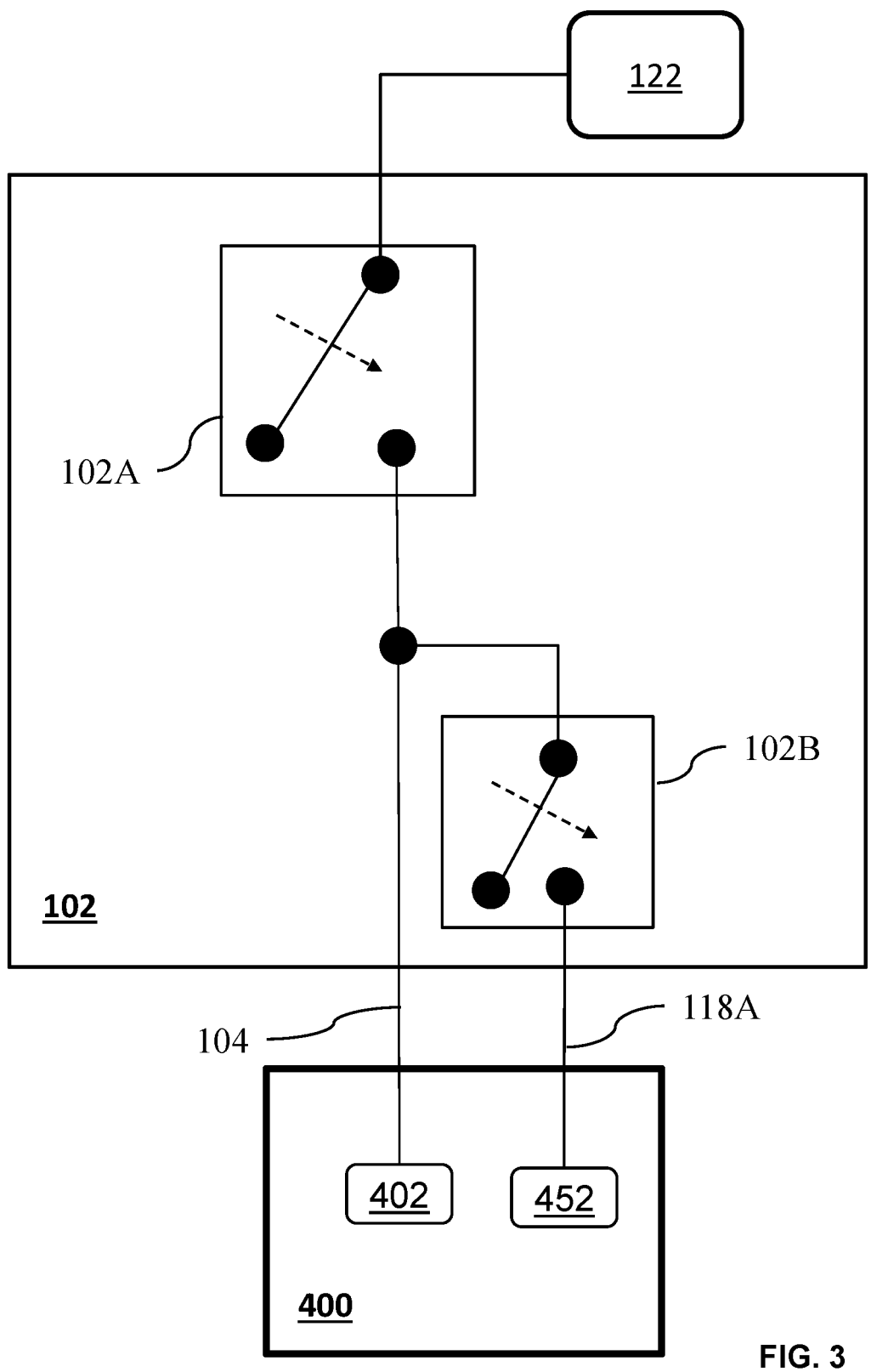
FIG. 3 depicts a schematic circuit for a starter switch for use with wire-management module of FIG. 1 and FIG. 2.

Referring to the embodiment as depicted in FIG. 3, the starter switch 102 includes a first switch 102A and a second switch 102B. The first switch 102A is configured to control whether the electrical system of the vehicle is powered on or off. The second switch 102B is configured to control whether the starter package 116 is powered on or off. The first and second switches (102A, 102B) may be configured to be controlled together or separately, etc. For example, in a bladed-key ignition device, the user inserts a key into the starter switch 102, and turns the key to flip the first switch 102A, and then the user further turns the key to flip the second switch 102B. As another example, in some push-to-start ignitions devices, the user must inserts the keyfob into a receiving slot positioned within the vehicle (such as a slot formed in the steering column), which controls the flipping action of the first switch 102A, and then the user pushes a button in the vehicle which controls the flipping action of the second switch 102B. As yet another example, in some vehicles a single push button may be used to control both the first and second switches (102A, 102B), such as pushing the button flips the first switch 102A, holding the button flips the second switch 102B.

Referring to the embodiment as depicted in FIG. 2, the starter switch 102 is placed in a third switch state. The starter switch 102 includes (preferably) at least two ganged blades or switches as shown in FIG. 3 and discussed above. A capacitor (known and not depicted) may be applied or mounted across the resistor R5 (to help smoothen or steady the signal applied to the controllable switch Q1). The controllable switch Q2 includes, preferably, a transistor, and further preferably, an N-channel MOSFET device (metal-oxide-semiconductor field-effect transistor). For a bladed-key ignition, the user applies and maintains manual control (pressure) on the starter switch 102 so that (A) application of voltage (power) is maintained to the ignition line 104 (the electrical system of the vehicle 100 remains activated); and (B) voltage is applied to the first wire 118A. For a push-to-start ignition, the user can push and hold the starter switch 102 (button), while a computer of the vehicle controls (A) application of voltage (power) to the ignition line 104 (the electrical system of the vehicle 100 remains activated); and (B) voltage applied to the first wire 118A. The wire-management module 400 is further configured to receive (input) a voltage from the first wire 118A extending from the starter switch 102.

When (after) the starter switch 102 applies voltage to the first wire 118A, it will be appreciated that if the controllable switch Q1 continues to allow current to pass to the coil 456, the switch 454 remains open, and the starter package 116 continues to remain disabled and cannot crank the vehicle engine 114, thereby the vehicle engine 114 remains OFF (the starter package 116 cannot crank the vehicle engine 114 when the switch 454 is opened). Thus, user authentication module 500 controls the state of controllable switch Q1, and thus controls whether the vehicle engine 114 can be activated, based on whether a user is authenticated.

In the third switch state of the starter switch 102, and for the case where the user-authentication module 500 CANNOT authenticate the user as being an authorized user, then (A) the controllable switch Q1 continues to remain closed; and (B) the flow of current through the coil 456 continues; and (C) the switch 454 remains open, in response to current flow through the coil 456; and (D) the starter package 116 continues to remain disabled and cannot crank the vehicle engine 114. The user-authentication module 500 is configured to (A) determine (compute, receive) an indication of whether the user, operating the starter switch 102, is an authenticated user; and (B) transmit (output) the wire-inhibit signal 207A (as depicted in FIG. 1) to the wire-management module 400, in which the wire-inhibit signal 207A is configured to indicate that the user, operating the starter switch 102 of the vehicle 100, is NOT an authenticated user. The functions (operations) of the user-authentication module 500 are described for example in U.S. Provisional Patent Application No. 63/012,536. The wire-management module 400 is further configured to receive (as input), from the user-authentication module 500, the wire-inhibit signal 207A (as depicted in FIG. 1), and close (or keep closed) the controllable switches Q2 and Q1, such that current flows through coil 456, switch 454 is open, starter package 116 is disabled, and engine 114 is prevented from starting. That is, the wire-inhibit signal 207A (to be received from the user-authentication module 500) is used to urge the controllable switch Q2 to close and cause grounding of the controllable switch Q1 (which closes the controllable switch Q1), and closing of the controllable switch Q1 enables current to flow through the coil 456, and the switch 454 opens (in response to energization of the coil 456), and the first wire 118A and the second wire 118B are isolated (disconnected). Since the first wire 118A and the second wire 118B are isolated (disconnected), the voltage from the starter switch 102 is prevented from being received by the starter package 116 (via the second wire 118B), thereby the starter motor 120 cannot be activated to crank (start) the vehicle engine 114.

While the third switch state of the starter switch 102 is maintained, and for the case where the user-authentication module 500 authenticates the user as being authorized, then (A) the user-authentication module 500 transmits the wire-enable signal 207B to the controllable switch Q2 (e.g. a transistor), thereby opening the controllable switch Q2, and opening of the controllable switch Q2 urges the controllable switch Q1 to open (to thereby stop supplying current to the coil 456 and causing de-energization of the coil 456); and (B) the switch 454 is closed in response to the stoppage of current flow through the coil 456 (since switch 454 is biased to close absent the supply of current through coil 456). When switch 454 is closed, current is enabled to flow from starter switch 102 to starter package 116, which enables starter motor 120 to crank engine 114 and starter engine 114.

In accordance with a preferred embodiment, the wire-inhibit signal 207A (to be received from the user-authentication module 500) includes about 3.3 volts DC when the user is NOT authenticated by the user-authentication module 500. This condition causes the controllable switch Q2 (an N-channel MOSFET) to close. In turn this grounds the controllable switch Q1 (a P-Channel MOSFET), thereby causing controllable switch Q1 to close so that current may flow through the coil 456, and the switch 454 opens in response to energization of the coil 456, etc. It will be appreciated that the wire-enable signal 207A and the wire-disable signal 207B may be applied over two separate lines as depicted in in FIG. 1), or as different signals on the same line (as depict in FIG. 2). The wire-enable signal 207B (to be received from the user-authentication module 500) is configured to urge the opening of the controllable switch Q2 and the opening of the controllable switch Q2, in turn, urges the opening of the controllable switch Q1 such that current does not flow through the coil 456, and the switch 454 moves to the closed state (in response to de-energization of the coil 456). In accordance with a preferred embodiment, the wire-enable signal 207B (to be received from the user-authentication module 500) includes zero volts DC when the user is authenticated by the user-authentication module 500; this condition causes the controllable switch Q2 and the controllable switch Q1 to open so that the current does not flow through the coil 456 (relay coil), and the switch 454 closes (in response to de-energization of the coil 456), etc. Once (after) the switch 454 is closed and while voltage continues to be applied to the second wire 118B, the starter package 116 is activated to crank the vehicle engine 114, thereby starting the vehicle engine 114 (since the user-authentication module 500 determined that the user is authorized). Once (after) the vehicle engine 114 is ON, the user (or a computer of the vehicle) stops the application of manual control (pressure) on the starter switch 102, and the starter switch 102 returns to the second switch state. The controllable starter switch module 152 (also called a starter solenoid as mentioned above) includes a starter relay switch 154 (also called a starter solenoid switch as mentioned above) and a starter relay coil 156 (also called a starter solenoid coil as mentioned above). The controllable switch module 152 is the starter driver (for energizing the starter relay coil 156) and includes the switch 154 and the coil 156. It will be appreciated that persons of skill in the art would be easy derive alternative circuits and configurations that meet (satisfy) the general requirements as identified in the Summary Section.

Referring to the embodiment as depicted in FIG. 2, in summary, the wire-management module 400 is further configured to connect the voltage from the starter switch 102 to the starter package 116 (since the first wire 118A and the second wire 118B are electrically connected together), for the case where: (A) the wire-management module 400 receives the wire-enable signal 207B (as depicted in FIG. 1) from the user-authentication module 500; and (B) the current flow through the coil 456 is stopped. The starter package 116 is configured to electrically couple the starter motor 120 to the vehicle battery 122 in response to the starter package 116 receiving the voltage from the second wire 118B via the wire-management module 400. Upon authentication of the user (in the third operating mode), the wire-enable signal 207B is used to manage the operation of the controllable switch Q1 and controllable switch Q2, preferably for a predetermined time period, such as five (5) minutes, etc. At some point in time, the wire-enable signal 207B may cease to be applied to the controllable switch Q2, and the current flowing through the coil 456 may resume while the vehicle engine 114 is cranked and turning. It will be appreciated that there is no need to continue to enable the starter package when (or after) the vehicle engine 114 has started (rotating). The coil 456 and the switch 454 are configured to selectively control the operation of the starter package 116. Once the vehicle engine 114 is rotating, the starter package 116 is no longer required, and therefore the starter package 116 may be shut off (deactivated). In accordance with a preferred embodiment, the wire-inhibit signal 207A includes the case where after (when) the wire-enable signal 207B ceases to be applied, the wire-management module 400 is configured to disable the connection between the first wire 118A and the second wire 118B. If the user wants to start the engine (whether or not the engine is currently running or not running), then if the starter switch 102 is moved to the third state (the start position or the first wire 118A receiving power from battery 122), the coil 456 will be energized so that the switch 454 will be open, and the starter motor 120 cannot be energized anymore (even if the user wanted it to be). It will be appreciated that not all vehicle batteries are rated for 12 volts DC.

Fourth Operating Mode

Referring to the embodiment as depicted in FIG. 2, the starter switch 102 is placed in the second switch state. The starter switch 102 returns from the third switch state to the second switch state, in which the starter switch 102 is configured to: (A) apply voltage to the ignition line 104 (thereby continuing to energize the electrical system of the vehicle 100); and (B) stop applying a voltage to the first wire 118A (thereby shutting OFF or deactivating the starter package 116), while the vehicle engine 114 continues to operate (rotate). The controllable switch Q1 is operated to make (urge) current flow through the coil 456 (in response to application of the voltage to the ignition line 104). For the fourth mode, the state of the controllable switch Q1 does not matter, since the vehicle engine 114 is operating (rotating). The switch 454 is opened when current is made to flow through the coil 456. When (after) the switch 454 is opened, the starter package 116 is disabled and cannot crank the vehicle engine 114 (the vehicle engine 114 is operating anyways, operation of starter package 116 is not needed in this mode).

Fifth Operating Mode

Referring to the embodiment as depicted in FIG. 2, the starter switch 102 is placed from the second switch state to the first switch state. The starter switch 102 returns back to the first switch state, in which the starter switch 102 is configured to (A) not apply voltage to the ignition line 104; and (B) not apply voltage applied to the first wire 118A. No current is provided to voltage regulator 412, and thus no current flow through the controllable switch Q1, so that there is no current flowing through the coil 456. It will be appreciated that the initiation of the controllable switch Q1 does not matter when no power (voltage) is applied to the ignition line 104. The switch 454 is normally closed when there is no current flowing through the coil 456. In the fifth operating mode, the electrical system of the vehicle 100 is OFF (not active). In response to the electrical system being turned OFF, spark plugs no longer operate, and the vehicle engine STOPS turning (cranking).

Referring to the embodiment as depicted in FIG. 2, for the case where (A) the wire-management module 400 is plugged into the user-authentication module 500 so that the 400 may receive power from the user-authentication module 500, and (B) the user-authentication module 500 malfunctions (fails to operate), then the wire-management module 400 is not able to permit authorized access to the operable system 115 of the vehicle 100, even if the user might be an authentic user. As a way to overcome such a limitation, the user (who is authorized) may be trained in advance to disconnect the user-authentication module 500 from the wire-management module 400 so that the signals no longer can be communicated from user-authentication module 500 to the wire-management module 400. In response to signal disconnection between the user-authentication module 500 and the wire-management module 400, the wire-management module 400 is configured to force or provide (for itself) the wire-enable signal 207B, thereby permitting operation of the operable system 115 of the vehicle 100 (such as activation of the starter package 116), even though the user-authentication module 500 is not working or used. In the preferred embodiment mentioned above where the wire-enable signal 207B is zero volts DC, removal of user-authentication module 500 causes the line to which user-authentication module 500 was connected to be at zero volts DC (i.e., equivalent to the wire-enable signal). In this manner, the operation of the vehicle 100 is not inconveniently delayed. When possible (at the earliest opportunity), the broken instance of the user-authentication module 500 may be replaced with a working instance of the user-authentication module 500. It will be appreciated that a thief (an unauthorized user) would not have such knowledge, and therefore, the vehicle 100 would remain inhibited since the thief would not know that removal of the user-authentication module 500 might enable operation of the vehicle 100.

Referring to the embodiment as depicted in FIG. 2, for the case where (A) the wire-management module 400 is plugged into the user-authentication module 500 so that the 400 may receive power from the user-authentication module 500, and (B) the user-authentication module 500 malfunctions, then the wire-management module 400 is not able to permit authorized access to the operable system 115 of the vehicle 100, even if the user might be an authentic user. A way to overcome this scenario is to unplug the user-authentication module 500 (or turn off the user-authentication module 500) from the controller area network 112, and the vehicle 100 may operate normally (since the wire-management module 400 is turned OFF as a result of turning OFF user-authentication module 500).

Referring to the embodiment as depicted in FIG. 2, in summary, the controllable switch module 452, based on the switching state, is configured to either allow (enable) or disallow (inhibit) application of voltage (power) from the starter switch 102 (via the first wire 118A and the second wire 118B being connected or not connected with each other) to the starter package 116. The first wire 118A and the second wire 118B are connected, or not connected, with each other depending on the status of the wire-management signal, such as the wire-inhibit signal 207A, the wire-enable signal 207B, etc. The switch 454 is normally closed when there is no current flow through the coil 456, and in this way, when the vehicle is powered down, the switch 454 will be closed, such that the first wire 118A (via the second wire 118B) is disconnected from the starter relay coil 156. For the case where the electrical system of the vehicle 100 is powered-up, but the wire-enable signal 207B is not received by the driver circuit module 402, then the controllable switch Q1 will be closed, such that current flows through the coil 456, causing the switch 454 to open, thereby disconnecting the first wire 118A and the second wire 118B from each other, thereby preventing energizing the starter package 116 (and subsequent cranking of the vehicle engine 114). For the case where the electrical system of the vehicle 100 is powered-up, and the wire-enable signal 207B is received via the driver circuit module 402, then the controllable switch Q1 will be open, such that current does not run through the coil 456, and the switch 454 remains closed, and the first wire 118A and the second wire 118B are connected together, thereby enabling ignition of the vehicle engine 114.

Referring to the embodiment as depicted in FIG. 2, the driver circuit module 402 is (preferably) further configured to sense the current flowing through the coil 456 via the current sensing device 414. The current sensing device 414 (of the driver circuit module 402) is configured to measure the current flow provided to the coil 456, and to multiply the measured value by a factor (to provide a measurable output 415). The current sensing device 414 includes (preferably) a current-sense amplifier configured to measure the voltage across the resistor R3, etc., which is indicative of current through the coil 456. In the illustrated example, the user-authentication module 500 is configured to receive (as input) a signal indicating a value associated with the output of the current sensing device 414. However, the signal indicating value associated with output of the current sensing device 414 can be received by any appropriate processing device. The current sensing device 414 is configured to transmit (output) the current flow information (pertaining to the current flowing through the coil 456) to the user-authentication module 500 (or other device such as the vehicle telematics device 200 for the case where the user-authentication module 500 includes the vehicle telematics device 200). It may be useful to infer and/or diagnose the status of the coil 456. The current sensing device 414 is configured to (A) detect whether there is any current flowing through the coil 456, and (B) transmit any detection of current, via the current sensing output 415, to the user-authentication module 500 (for logging or recording purposes, etc.). The user-authentication module 500 (or other processing device) can determine that, if there is no current detected by the current sensing device 414 when there should be current, the controllable switch module 452 may be faulty or improperly installed. Further, if current detected by the current sensing device 414 is different from an expected current (e.g. too high or too low), this can indicate that the controllable switch module 452 may be faulty, improperly installed, an incorrect component, or that there is a short in the circuit.

Referring to the embodiment as depicted in FIG. 2, a safety circuit 490 is configured to halt or limit the flow of current through the coil 456 WHEN the current sensing output 415 is too large, thereby preventing the flow of excessive current through the coil 456. The safety circuit 490 is configured to open the controllable switch Q2, which in turn urges the controllable switch Q1 to open and stop permitting the flow of current through the coil 456. The safety circuit 490 grounds the gate of the controllable switch Q2, and is configured to urge the controllable switch Q2 to open even while the wire-enable signal 207B is urging the controllable switch Q2 to close. The safety circuit 490 is configured to detect a threshold. The safety circuit 490 is configured to protect the controllable switch Q1 and the controllable switch module 452, in case there is an inadvertent user action or abnormal situations (such as when the controllable switch module 452 (relay) is removed from the wiring harness 300, and the user does something unwanted, or undesirable, to the bare terminals of the wiring harness 300). The safety circuit 490 is configured to protect the output of driver circuit module 402 (for the case where the controllable switch module 452 is removed or replaced, and the user inadvertently inserts an undesirable item into the open socket). The safety circuit 490 is configured to limit the current through the controllable switch Q1 which may involve shutting down the controllable switch Q1. In some cases, the safety circuit 490 urges the controllable switch Q2 to open while the wire-enable signal 207B urges the controllable switch Q2 to close, which may result in the controllable switch Q2 (and consequently the controllable switch Q1) oscillating between open and closed. To address this, a capacitor (not illustrated) can be connected parallel to resistor R5. Such a capacitor stores charge, and stabilizes current flowing through controllable switch Q1 to an acceptable value, instead of stopping all current from flowing through controllable switch Q1.

Referring to the embodiment as depicted in FIG. 2, the user-authentication module 500 (or other appropriate processing hardware) is configured to transmit a first condition that indicates whether the wiring harness 300 (as depicted in FIG. 1) is properly installed. The user-authentication module 500 is configured to transmit a second condition that indicates whether the controllable switch module 452 actuates (the relay mechanically actuates) in response to an actuation command. The user-authentication module 500 is configured to transmit a third condition that indicates the number of times that the wire-management module 400 was used. The user-authentication module 500 is configured to transmit a fourth condition that indicates whether the correct instance of the controllable switch module 452 was installed to the wiring harness 300.

Referring to the embodiment as depicted in FIG. 2, relays may be installed in the ignition line (and connected to the starter package 116), and the relays are normally opened (urged to remain open or enter the OFF state) by default (that is, before initiation of cranking of the fuel-operated engine of the vehicle). After (when) the electrical system of the vehicle 100 is powered up (activated) and before initiating cranking of the engine, the relays may be urged to close or enter the ON state (in response to receiving a user-authentication signal or command), thereby enabling the cranking of the engine of the vehicle 100 (via energization of the starter package 116). Once the user-authentication module 500 (or the vehicle telematics device 200) receives the user-authentication signal from an external device (such as a mobile device, an RFID card, etc.), the user-authentication module 500 is configured to provide the wire-management signal configured to manage (inhibit or enable) the relays used to control operation of the starter package 116, and subsequent cranking of the engine of the vehicle 100. The wire-management module 400 may include communication hardware configured to communicate with the mobile device (such as for receiving user-authentication signals, etc.). The wire-management module 400 may include hardware configured to monitor power lines connected to the relays, to detect improper installation, malfunction, etc.

The following is offered as further description of the embodiments, in which any one or more of any technical feature (described in the detailed description, the summary, and the claims) may be combinable with any other one or more of any technical feature (described in the detailed description, the summary, and the claims). It is understood that each claim in the claims section is an open ended claim unless stated otherwise. Unless otherwise specified, relational terms used in these specifications should be construed to include certain tolerances that the person skilled in the art would recognize as providing equivalent functionality. By way of example, the term perpendicular is not necessarily limited to 90.0 degrees and may include a variation thereof that the person skilled in the art would recognize as providing equivalent functionality for the purposes described for the relevant member or element. Terms such as "about" and "substantially", in the context of configuration, relate generally to disposition, location, or configuration that are either exact or sufficiently close to the location, disposition, or configuration of the relevant element to preserve operability of the element within the disclosure which does not materially modify the disclosure. Similarly, unless specifically made clear from its context, numerical values should be construed to include certain tolerances that the person skilled in the art would recognize as having negligible importance as they do not materially change the operability of the disclosure. It will be appreciated that the description and/or drawings identify and describe embodiments of the apparatus (either explicitly or inherently). The apparatus may include any suitable combination and/or permutation of the technical features as identified in the detailed description, as may be required and/or desired to suit a particular technical purpose and/or technical function. It will be appreciated that, where possible and suitable, any one or more of the technical features of the apparatus may be combined with any other one or more of the technical features of the apparatus (in any combination and/or permutation). It will be appreciated that persons skilled in the art would know that the technical features of each embodiment may be deployed (where possible) in other embodiments even if not expressly stated as such above. It will be appreciated that persons skilled in the art would know that other options may be possible for the configuration of the components of the apparatus to adjust to manufacturing requirements and still remain within the scope as described in at least one or more of the claims. This written description provides embodiments, including the best mode, and also enables the person skilled in the art to make and use the embodiments. The patentable scope may be defined by the claims. The written description and/or drawings may help to understand the scope of the claims. It is believed that all the crucial aspects of the disclosed subject matter have been provided in this document. It is understood, for this document, that the word "includes" is equivalent to the word "comprising" in that both words are used to signify an open-ended listing of assemblies, components, parts, etc. The term "comprising", which is synonymous with the terms "including," "containing," or "characterized by," is inclusive or open-ended and does not exclude additional, unrecited elements or method steps. Comprising (comprised of) is an "open" phrase and allows coverage of technologies that employ additional, unrecited elements. When used in a claim, the word "comprising" is the transitory verb (transitional term) that separates the preamble of the claim from the technical features of the disclosure. The foregoing has outlined the non-limiting embodiments (examples). The description is made for particular non-limiting embodiments (examples). It is understood that the non-limiting embodiments are merely illustrative as examples.

What is claimed is:

1. An apparatus, the apparatus for use with a vehicle having a first wire, a second wire and an operable system being configured to be energized in response to operative connection between the first wire and the second wire, and the apparatus also for use with a user-authentication module being configured to be installed to the vehicle, and the user-authentication module also being configured to transmit a wire-management signal including a wire-inhibit signal being configured to indicate lack of authorization to use the operable system of the vehicle and a wire-enable signal being configured to indicate authorization to use the operable system of the vehicle, the apparatus comprising:
a wire-management module having an installation structure being configured to be installable to the vehicle; and
the wire-management module being configured to be operatively coupled to the first wire; and
the wire-management module also being configured to be operatively coupled to the second wire; and
the wire-management module having a signal input port being configured to receive the wire-inhibit signal and the wire-enable signal being transmittable from the user-authentication module to the signal input port of the wire-management module; and
the wire-management module is configured to provide, for the wire-management module, the wire-enable signal, in response to signal disconnection between the user-authentication module and the wire-management module,
the wire-management module also being configured to inhibit operative connection between the first wire and the second wire, in response to the signal input port, of the wire-management module, receiving the wire-inhibit signal from the user-authentication module; and
whereby energization of the operable system of the vehicle is inhibited when the wire-management module inhibits operative connection between the first wire and the second wire, in response to the wire-management module receiving the wire-inhibit signal from the user-authentication module; and
the wire-management module is also configured to electrically connect the first wire and the second wire together in response to the wire-enable signal at the wire-management module; and
whereby energization of the operable system of the vehicle is enabled when the wire-management module enables operative connection between the first wire and the second wire, in response to the wire-management module receiving the wire-enable signal.

2. The apparatus of claim 1, wherein:
the first wire includes a hot wire; and
the second wire includes a neutral wire.

3. The apparatus of claim 1, wherein:
the first wire includes a hot starter wire; and
the second wire includes a neutral starter wire.

4. The apparatus of claim 1, wherein:
the second wire is configured to provide a return path to be provided by the first wire for initiating movement of the vehicle.

5. The apparatus of claim 1, wherein:
the first wire is configured to be connected to an electrical energy source of the vehicle.

6. The apparatus of claim 1, wherein:
the first wire is configured to be connected to a vehicle battery.

7. The apparatus of claim 1, wherein:
the first wire is configured to be connected to a starter switch configured to be connected to a vehicle battery of the vehicle.

8. The apparatus of claim 1, wherein:
the operable system includes a starter package configured to urge rotation of a starter motor configured to crank a vehicle engine of the vehicle; and
the second wire is configured to be electrically coupled to the starter package.

9. The apparatus of claim 1, wherein:
the second wire is configured to be electrically coupled to an electrical motor configured to move the vehicle.

10. The apparatus of claim 1, further comprising a computer device which includes the user-authentication module, wherein:
the computer device has a processor operatively connected to a memory unit configured to tangibly receive and store computer-executable instructions configured to execute operations of the user-authentication module; and
the computer device is configured to be electrically connectable to the wire-management module.

11. The apparatus of claim 1, further comprising a vehicle telematics device which includes the user-authentication module, wherein:
the vehicle telematics device is configured to electrically communicate with a controller area network of the vehicle; and
the vehicle telematics device is configured to be electrically connectable to the wire-management module.

12. The apparatus of claim 1, wherein:
the wire-management module includes:
a driver circuit module configured to receive the wire-management signal from the user-authentication module; and
a controllable switch module configured to be driven by a control signal provided by the driver circuit module to the controllable switch module.

13. The apparatus of claim 12, wherein:
the controllable switch module is included in a wiring harness configured to electrically connect the wire-management module to a starter switch and a starter package.

14. The apparatus of claim 1, further comprising a wiring harness configured to electrically connect:
an ignition line extending from a starter switch to the wire-management module; and the first wire extending from the starter switch to the wire-management module; and the second wire extending from the wire-management module to a starter package of the vehicle.

15. The apparatus of claim 1, wherein:

the operable system includes a keyless entry remote transmitter configured to operate at least one operable system of the vehicle; and the wire-management module is configured to be in wireless communication with the keyless entry remote transmitter.

16. The apparatus of claim 1, wherein the wire-enable signal is a zero volts DC signal.

17. The apparatus of claim 15, wherein the keyless entry remote transmitter is a wireless electronic device configured to start the vehicle.

18. A method for controlling energization of an operable system of a vehicle having a first wire and a second wire, the operable system of the vehicle configured to be energized in response to operative connection between the first wire and the second wire, the method comprising:

transmitting, from a user-authentication module being configured to be installed to the vehicle, a wire-management signal to a signal input port of a wire-management module, the wire-management module having an installation structure being configured to be installable to the vehicle, and the wire-management module being configured to be operatively coupled to the first wire and also coupled to the second wire;

inhibiting energization of the operable system of the vehicle, by the wire-management module inhibiting operative connection between the first wire and the second wire, in response to the signal input port of the wire-management module receiving a wire-inhibit signal as the wire-management signal from the user-authentication module, the wire-inhibit signal indicative of lack of authorization to use the operable system of the vehicle; and enabling energization of the operable system of the vehicle, by the wire-management module enabling operative connection between the first wire and the second wire, in response to the signal input port of the wire-management module receiving a wire-enable signal as the wire-management signal from the user-authentication module, the wire-enable signal indicative of authorization to use the operable system of the vehicle;

in response to disconnection between the user-authentication module and the wire-management module, providing, by the wire-management module for the wire-management module, the wire-enable signal as the wire-management signal, and enabling energization of the operable system of the vehicle, by the wire-management module enabling operative connection between the first wire and the second wire, in response to the wire-management module providing the wire-enable signal as the wire-management signal.

19. A method for controlling energization of an operable system of a vehicle being configured to be energized in response to operative connection between a first wire and a second wire of the vehicle, the method comprising:

inhibiting energization of the operable system of the vehicle, by a wire-management module; inhibiting operative connection between the first wire and the second wire, in response to a signal input port of the wire-management module receiving a wire-inhibit signal indicative of lack of authorization to use the operable system of the vehicle, wherein the wire-inhibit signal is received from a user-authentication module installable to the vehicle, and the wire-management module having an installation structure being configured to be installable to the vehicle, and the wire-management module being configured to be operatively coupled to the first wire and also coupled to the second wire;

enabling energization of the operable system of the vehicle, by the wire-management module enabling operative connection between the first wire and the second wire, in response to the signal input port of the wire-management module receiving a wire-enable signal indicative of authorization to use the operable system of the vehicle, wherein the wire-enable signal is received from the user-authentication module;

in response to disconnection between the user-authentication module and the wire-management module, providing, by the wire-management module for the wire-management module, the wire-enable signal; and enabling energization of the operable system of the vehicle, by the wire-management module enabling operative connection between the first wire and the second wire, in response to the wire-management module providing the wire-enable signal.

\* \* \* \* \*